US005297446A

United States Patent [19]

Krillenberger

[11] Patent Number: 5,297,446

[45] Date of Patent: Mar. 29, 1994

[54] SWITCH CALIBRATION MECHANISM

[75] Inventor: James M. Krillenberger, Bellville, Ohio

[73] Assignee: Therm-O-Disc, Incorporated, Mansfield, Ohio

[21] Appl. No.: 11,532

[22] Filed: Feb. 1, 1993

[51] Int. Cl.[5] ........ F16H 53/06

[52] U.S. Cl. ........ 74/569; 74/567

[58] Field of Search ........ 74/569, 567, 568 R, 74/568 M

[56] References Cited

U.S. PATENT DOCUMENTS

| | | | |
|---|---|---|---|
| 3,517,913 | 6/1970 | Rossem | 74/569 |
| 3,527,117 | 9/1970 | Sallberg et al. | 74/569 |
| 3,841,626 | 10/1974 | Weisgerber | 74/569 X |
| 3,915,129 | 10/1975 | Rust et al. | 74/569 X |
| 4,164,097 | 8/1979 | Hernandez | 74/569 X |
| 4,448,550 | 5/1984 | Moroney | 74/569 X |
| 4,471,859 | 9/1984 | Urban | 74/569 X |
| 4,841,792 | 6/1989 | Williams | 74/569 X |
| 5,152,188 | 10/1992 | Johann | 74/569 |

*Primary Examiner*—Vinh T. Luong

*Attorney, Agent, or Firm*—Jones, Day, Reavis & Pogue

[57] ABSTRACT

A switch calibration mechanism having a cam member that is rotatable about a longitudinal axis and that moves along said axis responsive to such rotation. A cam surface on the cam member cooperates with a cam follower on a movable calibrating member to adjust the operating point of a switch during longitudinal movement of the cam member.

18 Claims, 4 Drawing Sheets

SWITCH CALIBRATION MECHANISM

BACKGROUND OF THE INVENTION

This application relates to the art of switches and, more particularly, to calibration mechanisms for switches. The invention is particularly applicable for use in a temperature responsive switch and will be described with specific reference thereto. However, it will be appreciated that the invention has broader aspects and can be used in any switch requiring calibration.

Many temperature responsive switches require calibration to operate at a desired temperature. Calibration mechanisms are frequently complicated and difficult to adjust, and are sometimes unstable so that the desired calibration is lost. It would be desirable to have a relatively simple and inexpensive calibration mechanism that has good stability and is simple to adjust.

SUMMARY OF THE INVENTION

In accordance with the present application, a calibration mechanism is provided for a switch having a movable calibrating member to vary the switch operating point. The calibration mechanism includes a rotatable cam member that is rotatable about a longitudinal axis and also moves axially along such axis responsive to rotation thereof. A cam surface on the rotatable cam member cooperates with the switch calibrating member for adjustably moving same responsive to axial movement of the rotatable cam member.

In a preferred arrangement, the cam surface on the cam member lies on the surface of a cone that has a cone axis coincidental with the rotational longitudinal axis of the cam member.

In accordance with another aspect of the invention, the rotatable cam member has an externally threaded portion that is threadably received in a threaded bushing. The bushing has an external flat surface engaging an abutment for preventing rotation of the bushing and this provides enhanced stability by preventing unintentional rotation of the bushing and cam member. The bushing preferably extends through a hole in a support arm for the calibrating member and is secured to a switch case.

The external flat surface on the bushing for preventing rotation thereof is preferably provided by a polygonal bushing portion located inside of the switch case.

It is a principal object of the present invention to provide an improved calibrating mechanism for switches.

It is also an object of the invention to provide such a calibrating mechanism that has enhanced stability.

It is a further object of the invention to provide such a mechanism that is relatively simple to manufacture and adjust.

DESCRIPTION OF A PREFERRED EMBODIMENT

Figure 1:
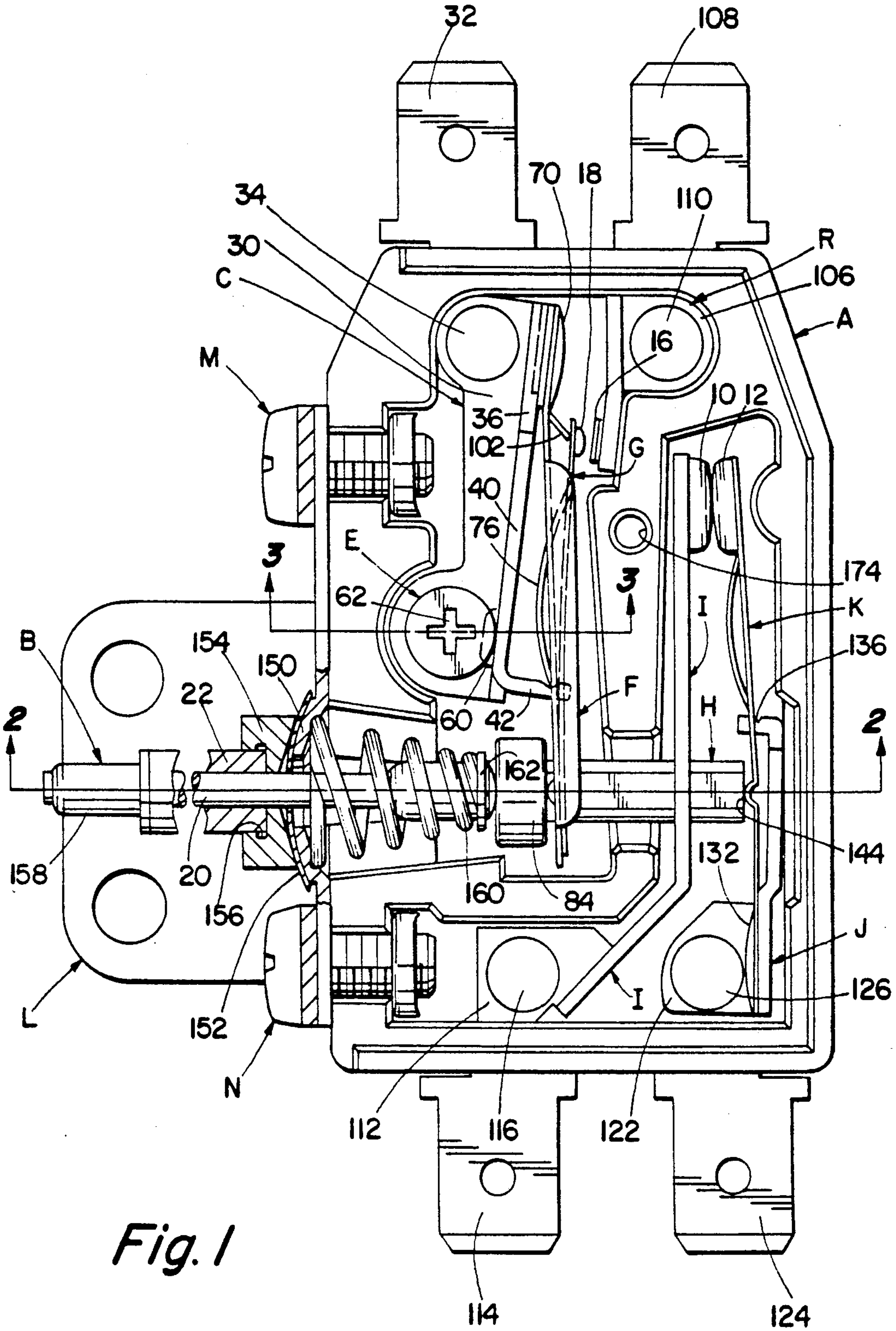
FIG. 1 is a top plan view of a switch case with the cover of the switch case removed to show the switch mechanisms mounted within the interior of the switch case.

Referring now to the drawing, wherein the showings are for purposes of illustrating a preferred embodiment of the invention only and not for purposes of limiting same, FIG. 1 shows a switch case A of dielectric material having a limit switch and a hot light warning switch mounted therein. The limit switch includes normally closed fixed and movable contacts 10, 12 that are opened when an excessive temperature condition occurs and this prevents damage to a cooktop due to overheating. The limit switch can be calibrated to open at a temperature between 545° C.–750° C. The hot light warning switch has normally open, fixed and movable contacts 16, 18 that are closed when a cooktop reaches a predetermined temperature. The hot light warning switch can be calibrated to close when the sensed temperature of the cooktop is between 75° C.–140° C.

Temperature sensing means B for sensing the temperature of the cooktop and operating the switches includes a metal rod 20 extending through a glass tube 22. Metal rod 20 has a much larger coefficient of thermal expansion than glass tube 22, and rod 20 moves to the right in FIG. 1 as sensing means B is heated. When the heating element for the cooktop is energized, the temperature of sensing means B rises until rod 20 expands far enough to operate the hot light warning switch and close contacts 16, 18. In the event of an over-temperature condition, rod 20 will expand far enough to operate the limit switch and open contacts 10, 12 to de-energize the heating element.

The hot light warning switch includes a support C having a base portion 30 attached to switch case A and to a terminal 32 by a rivet 34. Support C has an upright portion 36 perpendicular to base portion 30. An elongated slot 38 in upright portion 36 adjacent to base portion 30 forms an elongated bendable arm 40 that terminates in an integral perpendicular finger 42 having a generally V-shaped groove 44 therein.

Figure 3:
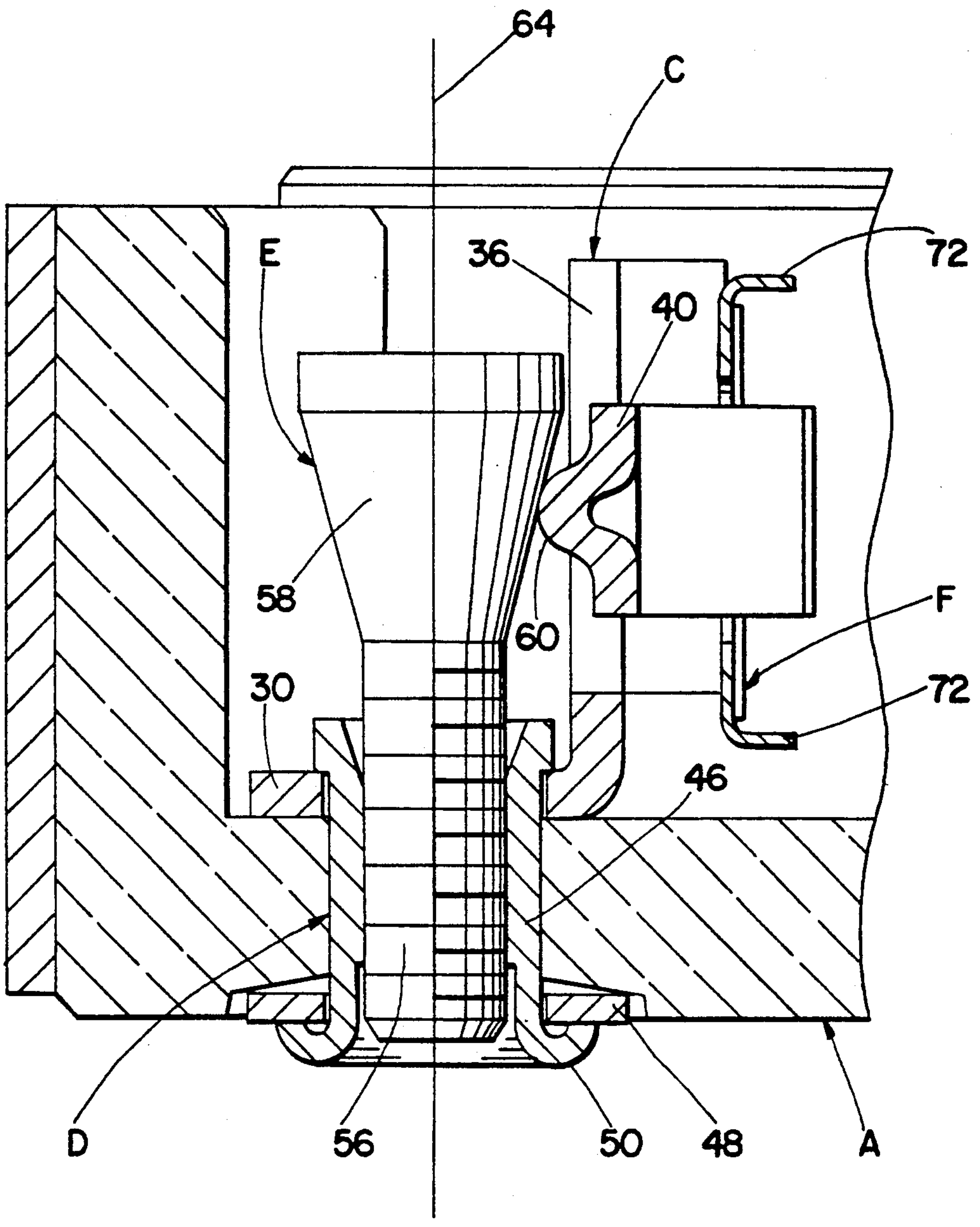
FIG. 3 is a partial cross-sectional elevational view taken generally on line 3—3 of FIG. 1.
Figure 4:
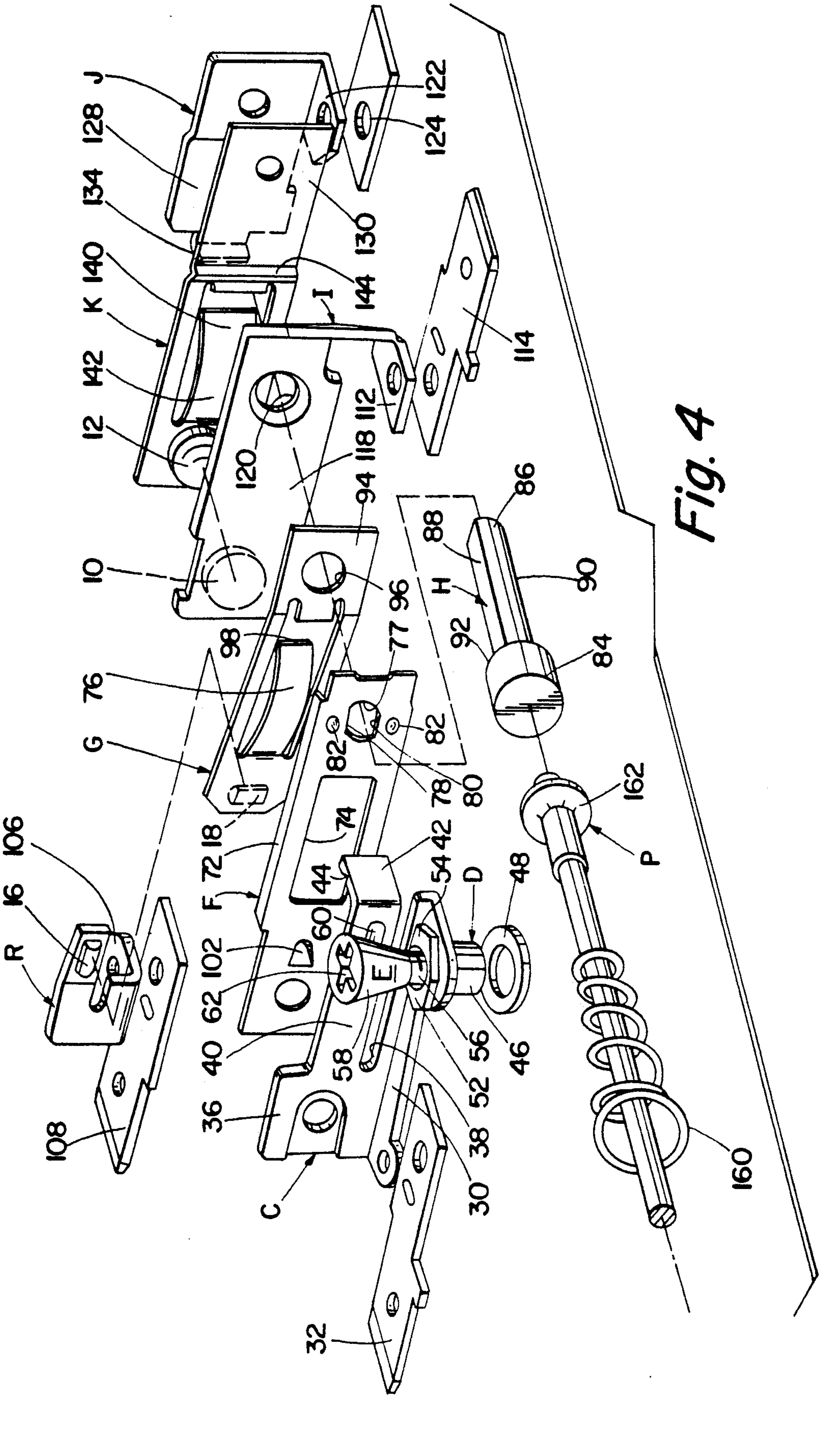
FIG. 4 is an exploded perspective illustration showing the individual parts of the switch mechanisms.

An internally threaded bushing D has a cylindrical portion 46 extending through suitable holes in switch case A and base portion 30 of support C. A washer 48 is positioned over the free end portion of bushing cylindrical portion 46 outside of switch case A and the terminal end portion of bushing cylindrical portion 46 is turned over as indicated at 50 in FIG. 3. Bushing D has an enlarged polygonal portion 52 located on the opposite side of support base portion 30 from switch case A. Bushing polygonal portion 52 has a plurality of flats thereon and one such flat 54 defines engaging means that is closely received against an abutment provided by upright support portion 36 below slot 38 to prevent rotational movement of bushing D.

A rotatable cam member E has a threaded shank 56 that is threadably received in bushing D. Cam member E has a cam surface 58 that lies on the surface of a cone for cooperation with a boss 60 that is deformed outwardly on arm 40 of support C. The end portion of cam member E has a recess 62 shaped for receiving a driving tool for selectively rotating cam member E. Rotational movement of cam member E also moves same axially along its longitudinal axis 64, and the cooperative engagement between cam surface 58 and the boss 60 moves arm 40 toward or away from axis 64 depending upon the direction of rotation of cam member E.

The movable arm 40 defines a movable calibrating member that is adjustably moved by rotation of cam member E. Movement of the calibrating member varies the location of groove 44 in finger 42 for adjusting the operating point of the hot light switch. After cam member E has been adjusted, thread sealant can be positioned within the open end of bushing D to prevent rotation of the cam member. Cam member E is effective to adjustably move the calibrating member defined by arm 40 during rotation of the cam member through a plurality of complete 360° rotations in the same direction. The tapered cam surface defined by frusto-conical portion 58 increases in diameter in a direction away from its threaded shank 56. The inclination of the tapered surface defined by frusto-conical portion 58 is such that it forms an included angle with longitudinal axis 64 between about 15°-25°. The length of tapered surface 58 along longitudinal axis 64 is at least 0.375 inch. The degree of adjustment made by each rotation of cam member E will depend upon the pitch of the threads. In one arrangement, each complete 360° rotation of cam member E moves the calibrating member defined by arm 40 about 0.005–0.007 inch toward or away from longitudinal axis 64. This makes it possible to achieve a very fine adjustment of the operating point for the hot light warning switch.

A carrier F for the movable contact of the hot light warning switch has one end portion secured to upright portion 36 of support C by rivet 70. Integral flanges 72 are provided over a major portion of the length of carrier F to impart stiffness thereto. An enlarged aperture 74 is provided in carrier F for receiving a leaf spring 76 on a snap blade G that carries movable contact 18.

The free end portion of carrier F has a hole 77 therethrough with opposite flat sides, 78, 80. A pair of pimples 82 are deformed outwardly from the free end portion of carrier F on opposite sides of hole 77. A bumper H has an enlarged head 84 and an elongated pin portion 86 that extends through hole 77 in carrier F. Opposite flat surfaces 88, 90 on pin portion 86 of bumper H cooperate with flats 78, 80 of hole 77 to prevent rotation of bumper H. This maintains more accurate adjustment of the operating points of the switches. The flat radial surface 92 at the intersection of bumper head 84 with pin portion 86 defines a shoulder that engages pimples 82 on carrier F.

End portion 94 of snap blade G is welded to the free end portion of carrier F. A hole 96 in snap blade end portion 94 is aligned with carrier hole 77 for freely receiving pin portion 86 on bumper H. Integral spring member 76 on snap blade G is under bending stress with its terminal end 98 received in groove 44 of finger 82 on the calibrating member defined by arm 40 on support C. A tab 102 bent outwardly from carrier F provides a stop engageable by snap blade G on the opposite side thereof from movable contact 18 in the open contact position of the hot light warning switch. Movement of the welded together end portions of carrier F and snap blade G by bumper H relative to groove 44 and terminal end 98 of spring portion 76 causes snap movement of blade G to open and close contacts 16, 18. Adjustment of cam member E moves groove 44 and terminal end 98 of spring portion 76 relative to the welded together end portions of carrier F and snap blade G to adjust the point at which snap action occurs.

Fixed contact 16 of the hot light warning switch is on a support R having a base portion 106 attached to switch case A and to a terminal 108 by a rivet 110.

A limit switch support I has a base portion 112 secured to switch case A and to a terminal 114 by rivet 116. An upright portion 118 of limit switch support I has fixed contact i thereon and has a hole 120 aligned with holes 96, 77 for freely receiving pin portion 86 of bumper H.

Limit switch support J has a base portion 122 secured to switch case A and to a terminal 124 by rivet 126. Upright portion 128 of support J has end portion 130 of snap blade K attached thereto by a rivet 132. A finger 134 on upright portion 128 of support J has a generally V-shaped groove 136 therein receiving terminal end 140 on leaf spring 142 integral with snap blade K that carries movable contact 12. An integral lateral boss 144 on snap blade K is engaged by the terminal end of bumper H to move snap blade K relative to groove 134 and spring member terminal end 140 to effect snap movement of snap blade K between contacts open and closed positions.

A switch mounting bracket L is attached to one side of switch case A by nut and bolt assemblies M, N. A spherically curved boss 150 on bracket L has a similarly curved washer 152 received thereover and a similarly curved bearing member 154 has a cylindrical recess 156 receiving an end portion of glass tube 22. A retaining member 158 attached to the free end portion of metal rod 20 traps glass tube 22 on rod 20. A coil spring 160 acts between a flange 162 on an eyelet P and the inner side of spherically curved boss 150 to urge rod 20 to the right in FIG. 1. The end of rod 20 engages enlarged head 84 on bumper H. When rod 20 expands, it moves to the right along with bumper H to close contacts 16, 18 of the hot light warning switch. In the event of an over-temperature condition, rod 20 will expand far enough to the right for moving bumper H a sufficient distance to open limit switch contacts 10, 12.

Figure 2:
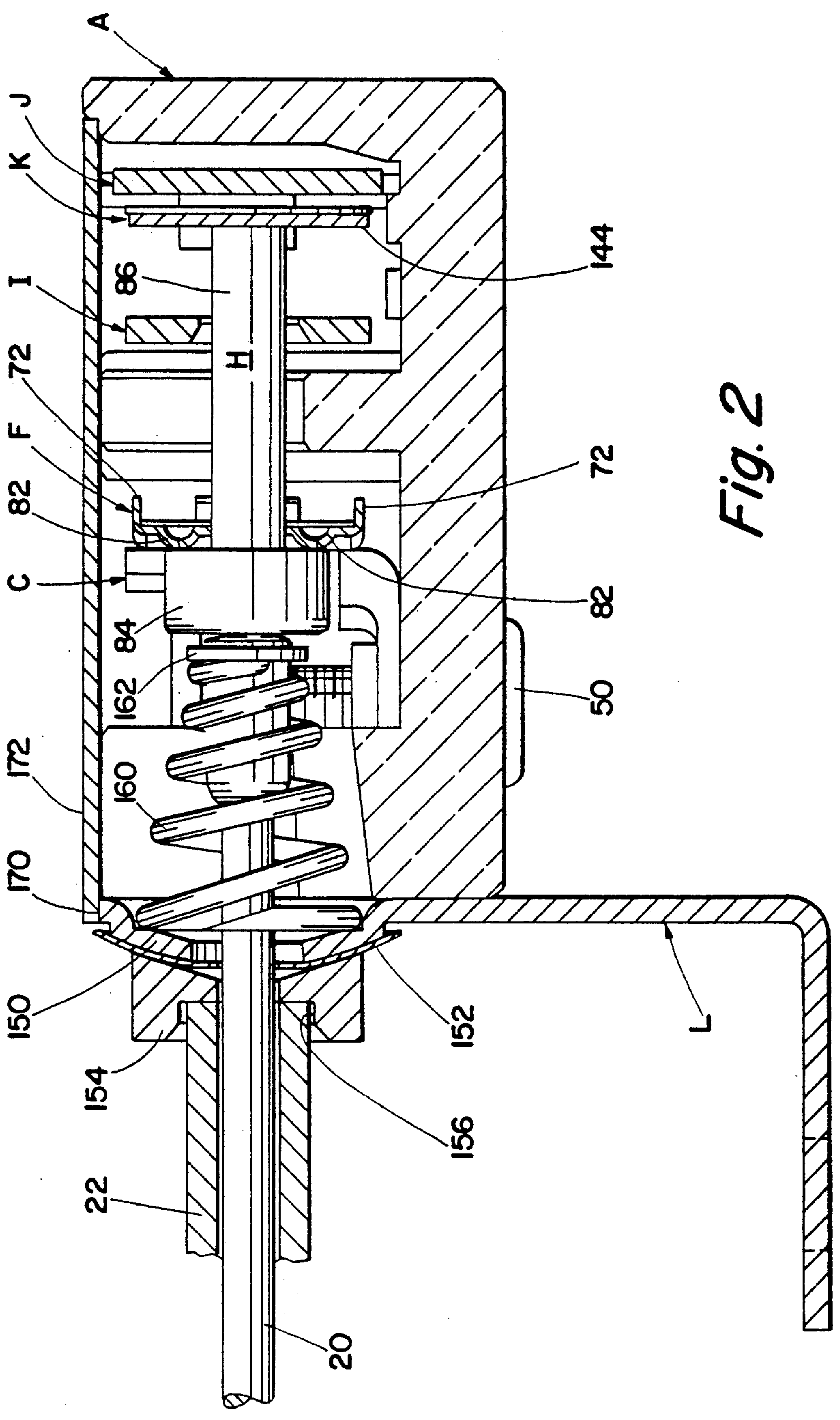
FIG. 2 is a partial cross-sectional elevational view taken generally on line 2—2 of FIG. 1.

Referring to FIG. 2, the side portion of switch mounting bracket L in which spherically curved boss 150 is formed has an upper end 17 that is overlapped by switch cover 172. Cover 172 has a suitable hole therethrough for receiving a screw that threads into a tapped hole 174 in switch case A. This overlapping arrangement of the cover with the mounting bracket helps to seal the interior of the switch case against dirt.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. In an electrical switch having a selectively variable operating point, said switch including an adjustable calibrating member for selectively adjusting said operating point by moving in response to selective movement of a cam member, said mechanism including a cam member that is mounted for selective rotation about a longitudinal axis and for movement axially along said axis responsive to rotation thereof, and a cam surface on said cam member cooperating with said calibrating member for adjustably moving same to adjust said switch operating point responsive to axial movement of said cam member by selectively rotating said cam member.

2. The mechanism of claim 1 wherein said cam surface lies on the surface of a cone having a cone axis coincidental with said longitudinal axis.

3. The mechanism of claim 1 wherein said cam member has an externally threaded portion received in a threaded bushing.

4. The mechanism of claim 3 wherein said bushing has an external flat surface engaging an abutment for preventing rotation of said bushing.

5. The mechanism of claim 1 wherein said calibrating member includes a boss engaging said cam surface.

6. The mechanism of claim 1 including a switch case having an internally threaded bushing secured thereto, said cam member having an externally threaded portion threadably received in said bushing.

7. The mechanism of claim 6 wherein said calibrating member is on a support arm having a hole through which said bushing extends for securing said support arm to said switch case.

8. The mechanism of claim 7 wherein said bushing has a cylindrical portion extending through said switch case and through said hole in said support arm, said bushing having an enlarged polygonal portion on the opposite side of said support arm from said switch case, and said support arm having an abutment engaging a flat side of said polygonal portion.

9. The mechanism of claim 1 wherein said switch comprises a snap-acting switch including a movable switch arm having an integral leaf spring bent therefrom, said leaf spring being under bending stress and having a free end supported in a groove on said calibrating member.

10. The mechanism of claim 1 wherein said cam member is mounted for selective rotation through a plurality of complete 360° rotations in the same direction and for continuous axial movement in one direction along said longitudinal axis responsive to such rotation.

11. In an electrical switch having an adjustable calibrating member for selectively adjusting the switch operating point by moving in response to selective movement of an adjusting screw, said mechanism including a threaded adjusting screw having a longitudinal axis and being threadably mounted for selective rotation about said axis and for movement axially along said axis during rotation thereof, said screw having a tapered cam surface engaging said calibrating member for moving said calibrating member toward and away from said axis responsible to axial movement of said screw by selectively rotating said screw.

12. The mechanism of claim 11 wherein said cam surface comprises a generally frusto conical cam surface on an end portion of said screw.

13. The mechanism of claim 11 wherein said screw has a threaded portion and a cam portion, and said frusto conical cam surface increases in diameter in a direction away from said threaded portion.

14. The mechanism of claim 11 including an internally threaded bushing threadably receiving said screw, and engaging means on said bushing for engaging an abutment to prevent rotation of said bushing.

15. The mechanism of claim 14 wherein said engaging means comprises a portion of said bushing having a polygonal cross-sectional shape.

16. The mechanism of claim 11 wherein said tapered cam surface is inclined at an included angle with said axis between about 15°–20°.

17. The mechanism of claim 11 wherein said tapered cam surface has a length parallel to said axis of at least 0.375 inch.

18. The mechanism of claim 11 wherein each complete 360° rotation of said screw moves said calibrating member about 0.005–0.007 inch.

* * * * *